United States Patent [19]

Hauser et al.

[11] 3,970,505

[45] July 20, 1976

[54] ANAEROBIC COMPOSITIONS AND SURFACE ACTIVATOR THEREFOR

[75] Inventors: Martin Hauser, West Hartford; Bernard M. Malofsky, Bloomfield, both of Conn.

[73] Assignee: Loctite Corporation, Newington, Conn.

[22] Filed: Aug. 20, 1974

[21] Appl. No.: 498,904

Related U.S. Application Data

[63] Continuation-in-part of Ser. No. 323,689, Jan. 15, 1973, abandoned.

[52] U.S. Cl. .......................... 156/331; 260/47 VA; 260/77.5 TB; 156/332; 156/310; 428/442; 526/217; 526/222; 526/227; 526/328
[51] Int. Cl.$^2$ ................. C08F 18/24; C08F 218/00; C08F 216/02; C08F 220/00
[58] Field of Search ....... 260/89.5 A, 80.75, 89.5 R, 260/88.3 F, 88.3 A, 86.1 E, 80.72, 80.81, 85.5 F, 85.5 ES, 80.73, 77.5 CR, 77.5 TB, 47; 156/331, 310, 332

[56] References Cited
UNITED STATES PATENTS

| | | | |
|---|---|---|---|
| 3,300,547 | 2/1967 | Gorman et al. | 260/89.7 R |
| 3,591,438 | 7/1971 | Toback et al. | 260/89.7 R |
| 3,625,930 | 12/1971 | Toback et al. | 260/89.7 R |
| 3,658,624 | 4/1972 | Lees | 156/332 |
| 3,794,610 | 2/1974 | Bachmann | 260/89.5 |

*Primary Examiner*—Joseph L. Schofer
*Assistant Examiner*—Herbert J. Lilling
*Attorney, Agent, or Firm*—Jean B. Mauro; J. Rodney Reck

[57] ABSTRACT

This invention concerns anaerobic compositions which contain acrylate ester monomers, peroxy polymerization initiators, a substituted thiourea, and an acidic substance and which exhibit improved ability to cure through relatively large gaps.

11 Claims, No Drawings

ANAEROBIC COMPOSITIONS AND SURFACE ACTIVATOR THEREFOR

CROSS REFERENCE TO RELATED APPLICATION

This application is a continuation-in-part of copending application Ser. No. 323,689, filed Jan. 15, 1973, now abandoned.

BACKGROUND OF THE INVENTION

This invention concerns anaerobic compositions, which have their primary utility in the area of polymerizable (curable) adhesives and sealants. Anaerobic compositions are commonly composed of curable unsaturated monomers, specifically acrylate ester monomers, in combination with peroxy polymerization initiators. While the peroxy initiator in the anaerobic composition is capable of polymerizing the monomer within a short time in the substantial absence of oxygen, such polymerization will not take place as long as the composition remains in adequate contact with oxygen.

The fact that the cure mechanism for anaerobic compositions is chemically blocked by atmospheric oxygen permits the composition to be stored in partially empty containers, preferably made of air permeable plastic such as low density polyethylene. Stored in such fashion, the anaerobic composition will remain in the liquid state. However, when placed between air impermeable surfaces, such as metal, glass, etc., the inhibiting influence of oxygen is lost and cure will commence in a relatively short time.

Two areas of particular interest in evaluating anaerobic compositions are the cure speed of the composition, and its ability to cure through gaps. For high speed production line applications where sealed or bonded articles cannot be stored for extended periods, and for equipment repair where prompt return to service is important, the highest possible rate of cure for the composition is desirable. (This assumes that the rapid cure speed does not produce overriding accompanying negative effects, such as undue embrittlement of the cured composition, or loss of other desirable properties.) Of additional and particular importance in anaerobic compositions is the cure through gap characteristic. As the gap (i.e., the space between the substrates to be sealed or bonded) becomes larger, the possibility of entrainment of atmospheric oxygen increases, and the area of the adhesive which is in contact with oxygen is also greater. Consequently, the inability to provide complete cure through large gaps has been a common problem with many anaerobic compositions.

Essentially all anaerobic compositions contain accelerators, compositions which do not destroy the shelf stability of the product but which accelerate the rate of cure once it has been initiated during use conditions. While these ingredients do increase the speed of cure of the products, they have provided little, if any, assistance in generating the ability to cure through gaps. Increased speed of cure also is produced in commercial practice by the use of surface primers or activators, chemical compounds which are applied to a surface prior to application of the anaerobic composition and which serve to dramatically increase the speed of cure. These compounds have not been added directly to the anaerobic composition due to their extreme activity and tendency to destroy the shelf stability of the product. Typical examples of such surface primers or activators are disclosed in, for example, U.S. Pat. Nos. 3,591,438 and 3,625,930. While the latter discloses thiourea as an effective accelerator, the disclosure is limited to cure through relatively small gaps. Various organometallic compounds are commonly used as such surface activators.

An anaerobic composition, or an anaerobic composition and a surface activator therefor, which provided improved speed of cure characteristics combined with the ability to cure through a gap, such as a gap of from about 5 to about 30 mils, would be a highly useful and desirable improvement in the area of anaerobic compositions, and a major advance in the art of sealing and bonding technology.

THE INVENTION

This invention concerns polymerizable compositions containing a polymerizable acrylate ester monomer, a hydroperoxide polymerization initiator for said monomer, a substituted thiourea, and an acidic compound.

This invention encompasses the polymerizable composition as a whole, as described above, as well as two-part anaerobic compositions wherein the acrylate ester monomer, the peroxy initiator, and optionally, the acidic substance are used as a first part, and either or both of the acidic substance and substituted thiourea are used as a second part. In this two-part fashion, the second part most commonly is used as a surface primer or activator prior to the application of the first part, although the second part can be mixed with the first immediately prior to use, if so desired.

Also included within the scope of this invention is the process for bonding substrates which involves applying to at least a portion of one of said substrates the above-described substituted thiourea surface primer (described above as the "second part"), applying to the same or a different substrate the monomer/peroxy initiator/optional acid mixture (described above as the "first part"), and maintaining the substrates so treated in abutting relationship with the first part and second part in mutual contact until the polymerizable composition has cured to seal and/or bond said substrates together.

DISCUSSION OF THE INVENTION AND ITS PREFERRED EMBODIMENTS

The above-described compositions and processes produce outstanding use characteristics compared to prior art compositions. Speed of cure is obtained which is as rapid or more rapid than most prior art systems, without materially affecting the strength, flexibility, toughness, etc., of the bond or seal which is formed. Adverse effects in such ultimate properties frequently were encountered in rapidly curing prior art systems. In addition, the compositions of this invention have been found to produce a reasonably rapid cure through substantial gaps, such as up to 20 mils and in some cases even more, such as 30 mils.

This is a most surprising and unexpected result, particularly when dealing with a surface activator. It has been found previously that the most rapid curing systems frequently produce the least desirable cure through gap properties, which probably was traceable to an extremely rapid surface polymerization which entraps the active polymerization accelerators in a high viscosity or solid layer near the surface, and prevents migration into the center of the gap. It was most surprising and unexpected to find the combination of properties presently achieved with the anaerobic compositions described herein.

As indicated above, the anaerobic composition has as required elements a polymerizable monomer and a peroxy initiator therefor which is latent in the presence of oxygen, but which is capable of polymerizing the monomer at room temperature within a reasonable period of time after removal of the inhibiting effect of oxygen.

The most desirable monomers for use in anaerobic compositions are polymerizable acrylate esters, preferably having a molecular weight of at least about 130. When used in the products of this invention, preferably at least a portion of the acrylate monomer is a di- or other polyacrylate ester. These poly-functional monomers produce cross-linked polymers, which serve as more effective and more durable sealants and adhesives.

The polyacrylate esters may be represented by the formula

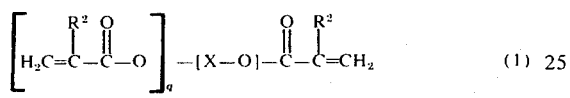 (1)

wherein $R^2$ is a radical selected from the group consisting of hydrogen, halogen and alkyl of from 1 to about 4 carbon atoms; $q$ is an integer equal to at least 1, and preferably equal to from 1 to about 4; and X is an organic radical containing at least two carbon atoms and having a total bonding capacity of $q$ plus 1. With regard to the upper limit for the number of carbon atoms in "X", workable monomers exist at essentially any value. As a practical matter, however, a general upper limit is about 50 carbon atoms, preferably 30, and most preferably about 20.

For example, X can be an organic radical of the formula

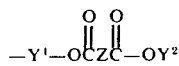

wherein each of $Y^1$ and $Y^2$ is an organic radical, preferably a hydrocarbon group, containing at least 2 carbon atoms, and preferably from 2 to about 10 carbon atoms, and Z is an organic radical, preferably a hydrocarbon group, containing at least 1 carbon atom, and preferably from 2 to about 10 carbon atoms. Other classes of useful polyacrylate ester monomers are the isocyanate-monoacrylate reaction products described in U.S. Pat. No. 3,425,988 to Toback and Gorman, issued Feb. 4, 1969, and the reaction products of di- or tri-alkylolamines (e.g., ethanolamines or propanolamines) with acrylic acids, such as are disclosed in French Pat. No. 1,581,361.

The most highly preferred acrylate esters which can be used in the compositions disclosed herein are polyacrylate esters which have the following general formula

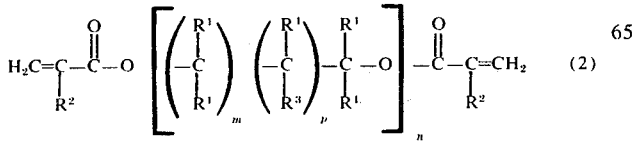 (2)

wherein $R^1$ represents a radical selected from the group consisting of hydrogen, lower alkyl of from 1 to about 4 carbon atoms, hydroxy alkyl of from 1 to about 4 carbon atoms, and

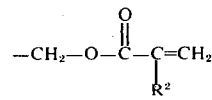

$R^2$ is a radical selected from the group consisting of hydrogen, halogen, and lower alkyl of from 1 to about 4 carbon atoms; $R^3$ is a radical selected from the group consisting of hydrogen, hydroxyl, and

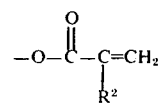

$m$ is an integer equal to at least 1, e.g., from 1 to about 15 or higher, and preferably from 1 to about 8 inclusive; $n$ is an integer equal to at least 1, e.g., 1 to about 40 or more, and preferably between about 2 and about 10; and $p$ is one of the following: 0, 1.

Typical examples of polyacrylate esters corresponding to the above general formula are di-, and tetraethyleneglycol dimethacrylate; di(pentamethyleneglycol) dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters—and particularly the polyacrylate esters described in the preceding paragraphs —have been found particularly desirable, monofunctional acrylate esters (esters containing one acrylate group) also may be used. When dealing with monofunctional acrylate esters, it is highly preferable to use an ester which has a relatively polar alcoholic moiety. Such materials are less volatile than low molecular weight alkyl esters and, more important, the polar group tends to provide intermolecular attraction during and after cure, thus producing more desirable cure properties, as well as a more durable sealant or adhesive. Most preferably the polar group is selected from the group consisting of labile hydrogen, heterocyclic ring, hydroxy, amino, cyano, and halogen polar groups. Typical examples of compounds within this category are cyclohexyl methacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

As indicated above the anaerobic compositions as discussed herein are prepared by mixing hydroperoxide initiator with one or more acrylate esters as described above. While the nature of the hydroperoxides is not critical to the broad concept of this invention, the general class of common hydroperoxides can be represented by the formula $R^4(OOH)_z$ wherein $R^4$ generally is a hydrocarbon group containing up to about 18 carbon atoms, and z is 1, 2 or 3. Preferably z is 1 and $R^4$ is an alkyl, aryl or aralkyl hydrocarbon group containing from about 3 to about 12 carbon atoms. Naturally $R^4$ can contain any substituent or linkage, hydrocarbon or otherwise, which does not affect the hydroperoxide adversely for the purpose disclosed herein. Typical examples of such hydroperoxides are cumene hydroperoxide, tertiary butyl hydroperoxide, methylethylketone hydroperoxide, and hydroperoxides formed by oxygenation of various hydrocarbons such as methylbutene, cetane, and cyclohexene, and various ketones and ethers, including certain compounds represented by the general formula (2) above.

The hydroperoxide initiators can be used within wide ranges, e.g., up to about 20% by weight of the composition. Most commonly, however, they comprise no more than about 10% by weight of the composition since above that level adverse effects on the strength and durability of the cured composition may be experienced. While in some instances lower amounts can be used, about 0.1% by weight of the composition is a common lower limit. Preferably the hydroperoxide initiator comprises from about 0.1% to about 5% by weight of the composition.

The substituted thiourea may be defined as a thiourea wherein at least three of the available nitrogen valences are satisfied by carbon atoms, i.e.,

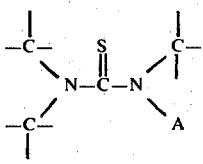

wherein A is either hydrogen or

The specific substituents on the available carbon atoms in this formula do not appear to be critical. While the speed of cure will be affected by such substituents, the ability to cure through large gaps appears to be retained.

The substituted thioureas generally conform to the following formulae:
A.

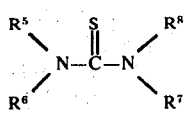

wherein each of $R^5$, $R^6$, $R^7$ and $R^8$ is a hydrocarbon group containing up to about 10 carbon atoms, preferably alkyl, aryl or alkenyl hydrocarbon groups, and most preferably containing up to about 6 carbon atoms. Alternatively, $R^5$ can be hydrogen. Examples of such compounds are tetramethyl thiourea, tetraethyl thiourea, tetrabutyl thiourea, dimethyldiethyl thiourea, and trimethyl thiourea.
B.

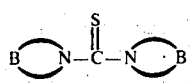

wherein B is a difunctional chain completing the heterocyclic ring (which is intended to include polynuclear heterocyclic ring systems) containing up to about 14 carbon atoms. Preferably the heterocyclic ring is hydrocarbon, and most preferably contains 4 or 5 carbon atoms. Examples of such compounds are dipentamethylene thiourea and dibutylene thiourea.
C.

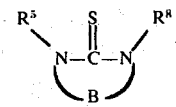

wherein $R^5$, $R^8$ and B are as defined above. Examples of such compounds are 3,5-dimethyl-hexahydro-1,3,5-oxadiazine-4-thione, and 3,5-diethyl-hexahydro-1,3,5-oxadiazine-4-thione.

The substituted thiourea should not be added or brought into intimate contact with the mixture of monomer and initiator prior to the time of intended use. Most of the substituted thioureas useful in this invention are too reactive and will cause premature hardening of the composition as a whole.

While the substituted thiourea can be mixed with the other ingredients immediately prior to application of the total composition to the surfaces to be sealed or bonded, the preferred and most common method of use is application of the substituted thiourea directly to one or both of the surfaces to be sealed or bonded. In this way, the substituted thiourea is brought into contact with the other ingredients at the time of sealing or bonding, and in the most convenient fashion.

Based upon the weight of the mixture of monomer and initiator, the useful level of substituted thiourea is very broad. Effectiveness can be seen at levels of 0.1% by weight, or even lower in some instances, since it serves as an initiator rather than a coreactant as such. While as much as 20% by weight conceivably could be used, it is unnecessary and wasteful.

In terms of its use as a primer or surface activator, the substituted thiourea is simply used at a concentration in solvent which will permit an adequate deposition of initiator on the surface by a single application of a thin film of the primer, such as by wiping, brushing or spraying. This concentration can vary within broad ranges, and is not critical for purposes of this invention. A suitable level is between about 0.1% and about 10% by weight of the solvent, and preferably between about 0.2% and about 5% by weight.

The cure speed of the adhesive or sealant composition will vary within the definitions of $R^5$, $R^6$, $R^7$, $R^8$ and B, but cure through gap properties are obtained. Naturally, these definitions permit the inclusion of various substituents and linkages which do not adversely affect the performance of the total composition as described herein. All of such substituted thiourea compounds are included within the broad scope of this invention.

The solvent used is one which will readily evaporate, e.g., one which will evaporate from a thin film in less than about five minutes, and preferably less than two minutes at room temperature. When used in aerosol containers, solvents which are liquids at the internal pressure of the pressurized container, but gasses at conditions of standard temperature and pressure, also may be used. Examples of solvents which generally can be used, singly or in combination, are benzene and toluene; chlorinated and/or fluorinated hydrocarbons such as trichloromonofluoroethane, methylene chloride, methylchloroform, trichloroethylene, and trichloroethane; lacquer type solvents, such as acetone, ethylacetate and methylethylketone; and alcohols, such as ethanol, propanol and isopropanol. The solvent solution of active ingredients then can be applied directly to the substrate to be bonded and the solvents will evaporate, leaving a coating of the surface activator upon the substrates. Since the primer can be applied in a number of coatings or a coating of any predetermined intensity, the amount of active ingredients dissolved in the solvent are not critical, and the general use ranges have been given previously.

As previously indicated, the other required ingredient is an acidic compound. It is this compound, in combination with the substituted thiourea, which gives the composition its ability to cure through gaps much larger than those for which unsubstituted thiourea is used, e.g., as disclosed in the aforementioned U.S. Pat. No. 3,625,930 to be approximately 3 mils. This acidic compound should have some perceptible solubility in the monomer/initiator mixture. While essentially any acidic compound, e.g., a sulfimide, may be considered an "acid" for purposes of the invention and in reasonable quantity will be useful, it is desirable for such acid to have a pKA less than about 6.0, preferably less than 5.0, and most preferably 4.0 or less. The acid preferably is highly soluble in the remainder of the anaerobic composition to facilitate distribution throughout the polymerizable mixture. While it is not absolutely essential, it is preferably for the acid to be an organic acid. While the extremely low pKA acids perform exceptionally well, it is not essential to go to extremely strong acids, and frequently it is desirable to avoid using such compounds in view of the hazards and corrosivity problems involved.

Typical examples which fall within the broad or preferred ranges discussed above are acrylic acid; salicyclic acid; sulfonic acids such as toluene sulfonic acid, nitrotoluene sulfonic acid, and propane sulfonic acid; dichloro- and trichloroacetic acids; and phosphonic acids such as benzene phosphonic acid. The acid is typically used at a concentration of about 0.001% to about 10% by weight of the medium in which it is contained.

The acid may be added directly to the mixture of polymerizable acrylate ester monomer and peroxy polymerization initiator. When this is done, the content of the acid should be between about 0.001% and about 10% by weight of the anaerobic composition. Higher amounts can be used but are unnecessary, and no benefit in terms of cure speed and cure through gap capability generally is achieved. A preferred range is between about 0.1% and about 5%.

The substituted thiourea and acid may be mixed and together used as a primer. When this is done, the balance between the two can vary within wide ranges. The key is to insure that an adequate minimum amount of each is used. A suitable use level of acidic substance in the solvent is between about 0.001% and about 5%, and preferably about 0.01% and about 2% by weight of the solution.

There are numerous optional additives which can be incorporated in the monomer/initiator mixture (i.e., the anaerobic composition), as is known in the art. Many of these additives can be used in the compositions of this invention. The most common additives are latent polymerization accelerators, compounds which do not of themselves initiate cure, but which accelerate the cure once it has been started by the polymerization initiator. It should be noted that large numbers of polymerization accelerators are known in the art, and the broad concept of this invention is intended to encompass any polymerization accelerator which can be incorporated in the anaerobic composition without destroying the essential characteristics of such composition. However, in view of the exceptional cure characteristics of the compositions of this invention, additional accelerators usually will not be required.

By way of example only, classes of such accelerators which may be used if desired are primary, secondary or tertiary organic amines containing up to about 20, preferably 15, carbon atoms; organic sulfimides containing up to about 15 carbon atoms; and amides containing up to about 10 carbon atoms. These accelerators generally are used within the range of 0.2 to about 5% by weight of the composition.

Another common class of additives are the polymerization inhibitors, which offer protection against spurious polymerization of the acrylate ester monomer prior to the time of intended use, such as during storage. The quinones have been found to be a particularly effective class of polymerization inhibitors, and can be used herein. Examples of such quinones are $\beta$-naphthoquinone, 2-methoxy-1,4-naphthoquinone, and p-benzoquinone. Other inhibitors are hydroquinone and stable nitroxide free radicals. These inhibitors are commonly used at levels between about 50 and 500 parts per million by weight of the anaerobic composition.

Other typical ingredients which can be used if desired to impart commercially desirable properties to the composition are thickeners, dyes, adhesive agents and thixotropic agents. Such materials can be used in such combination and proportions as desired, provided they do not adversely affect the anaerobic nature of the composition, or other essential properties thereof.

As explained above, it generally is preferable in the bonding or sealing operation to utilize the surface activator approach in which the substituted thiourea and, optionally, the acidic substance, is applied to either or both of the substrates as a first step. The balance of the composition (the monomer/initiator mixture, plus acid or any additives which may be used) is applied to either or both of the substrates as a second operation. It has been found that in this way the bonding operation is completed much more quickly following contact of the various active ingredients, and hence there is little danger of excessive cure taking place prior to completion of the bonding operation.

Following application of the composition to the substrates by whichever method is used, the substrates then are maintained in the predetermined relationship in which they are to be sealed or bonded until sufficient cure has taken place. While slightly longer times are required for the larger gaps, it has generally been found that cure will proceed sufficiently within a matter of minutes that outside fixturing of the substrates is not necessary. In this bond lines, such as 3 mils or less, this "fixturing" commonly take place in a matter of seconds.

As indicated above, even when the surface activator technique is utilized the cure will proceed through substantial gaps, such as 20 mils or even greater, within a reasonably short period of time. This was a most surprising and unexpected development, as has been explained above.

EXAMPLES

The following examples are given to demonstrate processes, compositions and bonded assemblies within the scope of the invention disclosed herein. The examples are not intended to be limitations in any way upon the scope of the invention. Unless specifically stated to the contrary, all ratios and percentages in the following examples are on a weight basis.

EXAMPLE I

Anaerobic Composition I was prepared, having the following approximate composition:

| Ingredients | Percent by Weight |
|---|---|
| Adhesive Monomer A* | 26 |
| Adhesive Monomer B** | 32 |
| Hydroxypropyl methacrylate | 30 |
| Methacrylic acid | 6 |
| Tributylamine | 1 |
| Cumene hydroperoxide | 5 |

*Prepared from hydrogenated bisphenol A, toluene diisocyanate and hydroxypropyl methacrylate.
**Prepared from an isocyanate terminated polyetherbased prepolymer and hydroxyethyl methacrylate.

This Example illustrates the inclusion of the acid in the monomer portion. This composition then was used to bond an approximate 1 inch overlap of two 1 × 3 inch glass slides. Metal wire spacers were put between the slides to establish predetermined gaps between the overlapped faces. In a first set of tests, the gaps were set at 2 mils and in a second series of tests, the gap was set at 20 mils.

A series of surface activators were used in these tests, specifically: (1) tetraethylthiourea; (2) dipentamethylene thiourea; (3) 3,5-dimethyl-hexahydro-1,3,5-oxadizine-4-thione; and (4) 3,5-diethyl-hexahydro-1,3,5-oxadizine-4-thione. Each surface activator was applied in a single thin film from a solution of methylchloroform. After allowing the solvent to evaporate, Anaerobic Composition I was applied and the glass slides assembled with the above-described spacers inbetween. The "fixture time" for each assembly was measured, referring to the time period following completion of the assembly before the slides could be moved as a unit (e.g., one slide does not move relative to the other).

The approximate concentrations of each surface activator by weight in the methylchloroform are shown in Table I, along with the fixture times in each instance.

TABLE I

| Surface Activator | Activator Conc. | Fixture Time | |
|---|---|---|---|
| | | 2 mil Gap | 20 mil Gap |
| 1 | 4% | 35 Sec. | 20 Min. |
| 2 | 2% | 30 Sec. | 27 Min. |
| 3 | 4% | 45 Sec. | 23 Min. |
| 4 | 4% | 60 Sec. | 35 Min. |

EXAMPLE II

This Example illustrates the addition of the acid to the surface activator. The experiment of the preceding Example was repeated using two of the accelerators described therein, except that in each case an amount of salicylic acid was added to the methylchloroform solution of surface activator prior to its application to the glass surface. The same tests were run as described in Example I. The amounts of salicylic acid by weight of the solvent solution and the test results are presented below in Table II.

TABLE II

| Surface Activator of Example I | Salicylic Acid conc. | Fixture Time | |
|---|---|---|---|
| | | 2 mil gap | 20 mil gap |
| 1 | 1% | 20 sec. | 15 min. |
| 4 | 2% | 30 sec. | 25 min. |

EXAMPLE III

In the tests of this Example, a series of activators was used which contained various thiourea derivatives. The standard activator solution was taken to be 4% by weight tetramethyl thiourea, and all other solutions were prepared on an equimolar basis. Methylchloroform was the solvent in each case. The anaerobic composition had the following approximate composition:

| Ingredients | Percent by Weight |
|---|---|
| Adhesive Monomer A | 17 |
| Adhesive Monomer B | 33 |
| Hydroxypropyl methacrylate | 37 |
| Acrylic Acid | 7 |
| Cumene hydroperoxide | 5 |
| Tributylamine | 1 |

In this composition, Monomer A and Monomer B are as in Example I. The fixture times in 20 mil gaps on steel lap strips were determined. The specific activators and the fixture times in 20 mil gaps are recorded below in Table III. All tests requiring greater than 60 minutes to fixture, were discontinued at that point. Since such products would be commercially unsatisfactory, these latter tests are recorded below as > 60 min.

TABLE III

| Activator | Fixture Time |
|---|---|
| Tetramethylthiourea | 10 min. |
| Trimethylthiourea | 30 min. |
| Dimethylthiourea | >60 min. |
| Methylthiourea | >60 min. |
| Thiourea | >60 min. |

EXAMPLE IV

A surface activator composed of 3% tetramethylthiourea and 1% salicylic acid in "Freon TE" solvent was used in the bonding of glass slides as described in Example I, employing a variety of anaerobic adhesive compositions. The approximate compositions of the anaerobic adhesive used were as follows:

| Ingredients | Anaerobic Composition (Weight percent) | | |
|---|---|---|---|
| | No. II | No. III | No. IV |
| Polyethyleneglycol dimethacrylate (average molecular weight=330) | 96.0 | 60.7 | 64.0 |
| Hydroxyethyl methacrylate | — | — | 20.0 |
| Cumene hydroperoxide | 3.3 | 3.0 | 2.2 |
| Benzoic sulfimide | 0.4 | 0.4 | 1.2 |
| Dimethyl-p-toluidine | 0.3 | — | — |
| Dimethyl-o-toluidine | — | 0.3 | 0.3 |
| Diethyl-p-toluidine | — | 0.5 | 0.5 |
| Tetraethyleneglycol di-2-ethylhexoate | — | — | — |

-continued

| Ingredients | Anaerobic Composition (Weight percent) | | |
|---|---|---|---|
| | No. II | No. III | No. IV |
| Thickener | | 34.3 | 11.6 |
| Methanol | — | 0.8 | 0.8 |

The results in testing involving 2 mil and 20 mil gaps on glass slides are shown below in Table IV.

TABLE IV

| Anaerobic Composition | Fixture Time | |
|---|---|---|
| | 2 mil gap | 20 mil gap |
| II | 12 Sec. | 30 Min. |
| III | 20 Sec. | 23 Min. |
| IV | 25 Sec. | 31 Min. |

EXAMPLE V

In this experiment a series of activators was used employing 4% by weight tetramethylthiourea and 1% by weight organic acid in "Freon TE" solvent. These activators were used to test a series of anaerobic adhesive compositions containing various peroxy initiators, the approximate compositions of the anaerobic adhesives being as follows:

| Ingredients | Wt. % |
|---|---|
| Adhesive Monomer C * | 79.0 |
| Polyethyleneglycol dimethacrylate | 6.6 |
| Hydroxypropyl methacrylate | 4.6 |
| Acrylic Acid | 6.4 |
| Peroxy initiator | 3.0 |
| Benzoic sulfimide | 0.4 |

* Prepared from 4,4'-diphenylmethylenediisocyanate and hydroxypropylmethacrylate.

The acids, initiators and fixture times for the specific compositions are shown in Table V below. It will be noted that acceptable cure through gap capability was demonstrated only by the compositions containing the t-butylhydroperoxide.

TABLE V

| Peroxy Initiator | Fixture Time, with Activator containing by weight 2% of the following | | | |
|---|---|---|---|---|
| | Salicylic | Dichloro-acetic | Trichloro-acetic | None |
| Di-t-butyl peroxide | >20 hrs. | >20 hrs. | >20 hrs. | >20 hrs. |
| 2,5-dimethyl-2,5-di-t-butyl peroxyhexane | " | " | " | " |
| t-butyl perbenzoate | " | " | " | " |
| t-butyl hydroperoxide | 20 Min. | 20 Min. | 50 Min. | 25 Min. |

We claim:
1. A polymerizable composition, curable through gaps of twenty mils or more, comprising a polymerizable acrylate ester monomer selected from the group consisting of monofunctional acrylate esters and polyacrylate esters having the formula

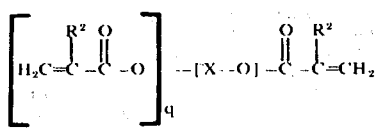

wherein $R^2$ is a radical selected from the group consisting of hydrogen, halogen and alkyl of from 1 to about 4 carbon atoms; $q$ is an integer equal to at least 1; and X is an organic radical containing at least two carbon atoms and having a total bonding capacity of $q$ plus 1; at least 0.1% of a hydroperoxide polymerization initiator capable of polymerizing said monomer in the substantial absence of oxygen, a cure-through-gap agent consisting of a combination of;

a. a substituted thiourea of the formula

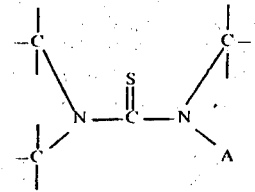

wherein A is hydrogen or

and b. about 0.1% to about 5% by weight of the composition of an acid having a pKA of less than about 6 and soluble in the mixture of acrylate ester monomer and hydroperoxide initiator.

2. The composition of claim 1 wherein the acrylate ester monomer has a molecular weight of at least about 130 and the polymerization initiator is a hydroperoxide containing up to about 18 carbon atoms.

3. A two-part polymerizable composition, curable through gaps of twenty mils or more, consisting essentially of:

A. a first part comprising a mixture of a polymerizable acrylate ester monomer selected from the group consisting of monofunctional acrylate esters and polyacrylate esters having the formula

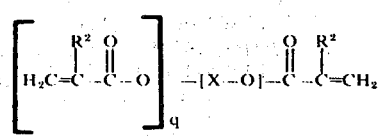

wherein $R^2$ is a radical selected from the group consisting of hydrogen, halogen and alkyl of from 1 to about 4 carbon atoms; $q$ is an integer equal to at least 1; and X is an organic radical containing at least two carbon atoms and having a total bonding capacity of $q$ plus 1; and a hydroperoxy polymerization initiator capable of polymerizing said monomer in the substantial absence of oxygen;

B. as a cure-through-gap agent a second part comprising the combination of a substituted thiourea of the formula

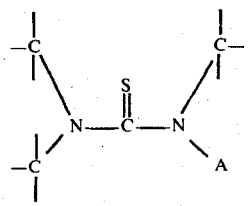

wherein A is hydrogen or

and
C. about 0.1% to about 5% by weight of the composition of an acid having a pKA of less than about 6 in admixture with either (A) or (B).

4. The composition of claim 3 wherein the substituted thiourea has one of the following formulae:
a.

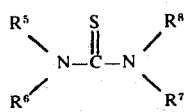

wherein each of $R^6$, $R^7$ and $R^8$ is a hydrocarbon group containing up to about 10 carbon atoms, and $R^5$ is hydrogen or $R^8$;
b.

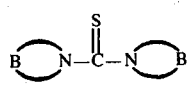

where each B is a difunctional chain completing a heterocyclic ring containing up to about 14 carbon atoms; and
c.

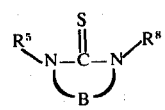

wherein $R^5$, $R^8$ and B are as defined above.

5. The composition of claim 4 wherein the hydroperoxide polymerization initiator comprises from about 0.1% to about 10% by weight of the polymerizable composition.

6. The composition of claim 5 wherein $q$ is equal to from 1 to about 4.

7. A two-part polymerizable composition, curable through gaps of 20 mils or more, consisting essentially of:
A. a first part comprising a polymerizable acrylate ester monomer having a molecular weight of at least about 130 and selected from the group consisting of monofunctional acrylate esters and polyacrylate esters having the formula

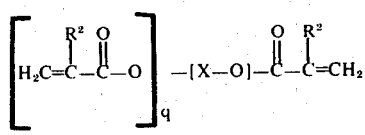

wherein $R^2$ is a radical selected from the group consisting of hydrogen, halogen and alkyl of from 1 to about 4 carbon atoms; $q$ is an integer equal to at least 1; and X is an organic radical containing at least two carbon atoms and having a total bonding capacity of $q$ plus 1; from about 0.1% to about 10% by weight of a hydroperoxide polymerization initiator capable of polymerizing said monomer in the substantial absence of oxygen; and B. as a cure-through-gap agent a second part comprising the combination of a solvent solution of a substituted thiourea having one of the formulae;
a.

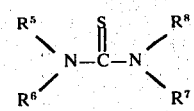

wherein each of $R^6$, $R^7$ and $R^8$ is a hydrocarbon group containing up to about 10 carbon atoms, and $R^5$ is hydrogen or $R^8$;
b.

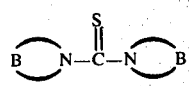

where each B is a difunctional chain completing a heterocyclic ring containing up to about 14 carbon atoms; and
c.

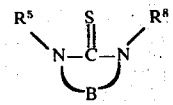

wherein $R^5$, $R^8$ and B are as defined above, and about 0.1% to about 5% by weight of the composition of an acid having a pKA of less than about 6.

8. The composition of claim 7 wherein the substituted thiourea is tetramethyl thiourea.

9. A process for sealing or bonding substrates which comprises:
A. applying to at least one of said substrates a primer composition, capable of curing the composition of part (B) through gaps of twenty mils or more, comprising a mixture of a substituted thiourea of the formula

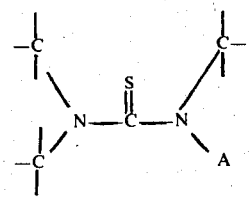

wherein A is hydrogen or

and about 0.1% to about 5% of an organic acid having a pKA less than about 6;

B. applying to at least one of said substrates a polymerizable composition comprising a polymerizable acrylate ester monomer selected from the group consisting of monofunctional acrylate esters and polyacrylate esters having the formula

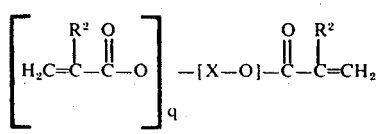

wherein $R^2$ is a radical selected from the group consisting of hydrogen, halogen and alkyl of from 1 to about 4 carbon atoms; $q$ is an integer equal to at least 1; and X is an organic radical containing at least two carbon atoms and having a total bonding capacity of $q$ plus 1; and from about 0.1% to about 10% by weight of a hydroperoxide polymerization initiator capable of polymerizing said monomer in the substantial absence of oxygen;

C. and thereafter placing said substrates in an abutting relationship until the polymerizable composition has hardened sufficiently to seal or bond said substrates.

10. The process of claim 9 wherein the substituted thiourea has one of the formulae:

a.

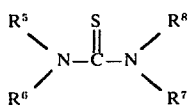

wherein each of $R^6$, $R^7$ and $R^8$ is a hydrocarbon group containing up to about 10 carbon atoms, and $R^5$ is hydrogen or $R^8$;

b.

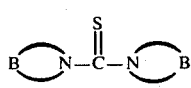

where each B is a difunctional chain completing a heterocyclic ring containing up to about 14 carbon atoms; and c.

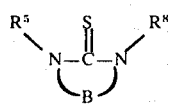

wherein $R^5$, $R^8$ and B are as defined above.

11. A process for sealing or bonding substrates which comprises:

A. applying to at least one of said substrates a primer composition, capable of curing the composition of part (B) through gaps of 20 mils or more, comprising a mixture of a substituted thiourea of the formula

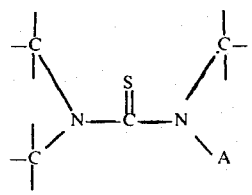

wherein A is hydrogen or

B. applying to at least one of said substrates a polymerization composition comprising a polymerizable acrylate ester monomer selected from the group consisting of monofunctional acrylate esters and polyacrylate esters having the formula

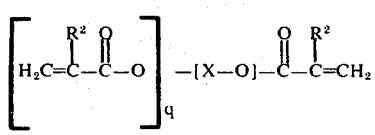

wherein $R^2$ is a radical selected from the group consisting of hydrogen, halogen and alkyl of from 1 to about 4 carbon atoms; $q$ is an integer equal to at least 1; and X is an organic radical containing at least two carbon atoms and having a total bonding capacity of $q$ plus 1; from about 0.1% to about 10% by weight of a hydroperoxide polymerization initiator capable of polymerizing said monomer in the substantial absence of oxygen; and about 0.1% to about 5% of an organic acid having a pKA less than about 6;

C. and thereafter placing said substrates in an abutting relationship until the polymerizable composition has hardened sufficiently to seal or bond said substrates.

* * * * *